(12) United States Patent
Blackburn et al.

(10) Patent No.: US 10,617,121 B2
(45) Date of Patent: Apr. 14, 2020

(54) CHROMOBACTERIUM SPECIES WITH INSECTICIDAL ACTIVITY

(71) Applicant: The United States of America, as represented by the Secretary of Agriculture, Washington, DC (US)

(72) Inventors: Michael B. Blackburn, Woodbine, MD (US); Dawn E. Gundersen-Rindal, Silver Spring, MD (US); Robert R. Farrar, Bowie, MD (US); Daniel J. Kuhar, Laurel, MD (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 16/380,747

(22) Filed: Apr. 10, 2019

(65) Prior Publication Data

US 2019/0343124 A1    Nov. 14, 2019

Related U.S. Application Data

(62) Division of application No. 15/448,777, filed on Mar. 3, 2017, now abandoned.

(60) Provisional application No. 62/304,594, filed on Mar. 7, 2016.

(51) Int. Cl.
*A01N 63/00*    (2020.01)
*A01N 25/00*    (2006.01)

(52) U.S. Cl.
CPC ........... *A01N 63/00* (2013.01); *A01N 25/006* (2013.01)

(58) Field of Classification Search
CPC .............................. A01N 63/00; A01N 25/006
See application file for complete search history.

*Primary Examiner* — Sarvamangala Devi
(74) *Attorney, Agent, or Firm* — John Fado; Ariel Atkinson

(57) ABSTRACT

Strains of *Chromobacterium sphagni* sp. *nov.* are described which have insecticidal activity against insect larvae, in general, and lepidopteran insect larvae, in particular. A biocontrol agent containing one or more *C. sphagni*, media in which the *C. sphagni*, or both, and optionally a carrier are also described. Methods of killing insect larvae and methods of reducing insect populations in an area by applying to the area or an object an effective amount of the biocontrol agent are also described.

12 Claims, 1 Drawing Sheet

Specification includes a Sequence Listing.

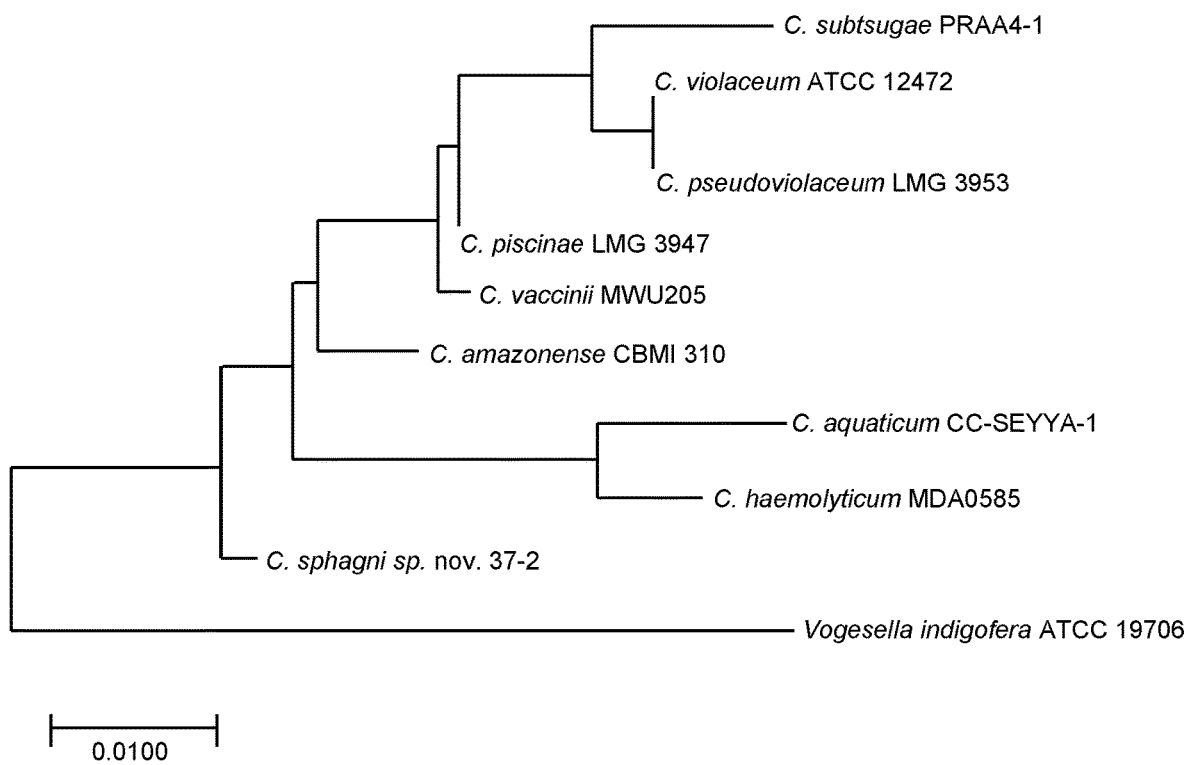

US 10,617,121 B2

CHROMOBACTERIUM SPECIES WITH INSECTICIDAL ACTIVITY

CROSS REFERENCE TO RELATED APPLICATIONS

This application is related to and claims priority from U.S. patent application Ser. No. 15/448,777 filed Mar. 3, 2017, which itself claims priority from U.S. Provisional Patent Application 62/304,594 filed on Mar. 7, 2016, the contents of both of which are incorporated herein in their entireties.

BACKGROUND OF THE INVENTION

Sequence Listing

The Sequence Listing submitted via EFS-Web as ASCII compliant text file format (.txt) filed on Apr. 10, 2019, named "SequenceListing", (created on Apr. 10, 2019, 7 KB), is incorporated herein by reference. This Sequence Listing serves as paper copy of the Sequence Listing required by 37 C.F.R. § 1.821(c) and the Sequence Listing in computer-readable form (CRF) required by 37 C.F.R. § 1.821(e). A statement under 37 C.F.R. § 1.821(f) is not necessary.

FIELD OF THE INVENTION

This invention relates to a novel species of *Chromobacterium*, which is being named *Chromobacterium sphagni* sp. nov., that has insecticidal activity. This invention also relates to compositions containing these novel *Chromobacterium* strains and use of these compositions to kill insect larvae.

DESCRIPTION OF RELATED ART

Lepidoptera is an order of insects that includes moths and butterflies. The larvae of many Lepidoptera are economic pests for agriculture because they feed on many different types of crops. While many birds and other animals feed on Lepidoptera, these predators do not sufficiently reduce the harm caused by the larvae to food crops. Parasitic wasps and flies also help reduce the lepidopteran populations, but again not sufficiently to reduce economic damage to crops. On the other hand, insecticides can be used to destroy populations of Lepidoptera. But many of the insecticides are non-specific and harm beneficial animals, especially bees and birds. Further, the pesticides can enter groundwater and be ingested by humans, again causing harm. As such, a need exists for compositions that can kill lepidopteran larvae and methods of using the compositions to kill lepidopteran larvae, thereby protecting crops.

Other insects also destroy economically valuable plants (crops, trees, ornamental plants) by feeding on the economically valuable plants either while in larvae stage or as an adult. It is difficult to kill many these insects or reduce their population without using pesticides that are harmful to the plant or mammals that eat the plants.

Until recently, purple-pigmented bacteria of the genus *Chromobacterium* were represented by a single species, *Chromobacterium violaceum* (Bergonzini 1881). *Chromobacterium violaceum* is best known for production of the purple pigment violacein, which has exhibited diverse antimicrobial and antitumor activities. In 2007, Martin, et al., Int. J. Systemic and Evolutionary Micro 57:993-999 (2007) described *Chromobacterium subtsugae*, which in addition to violacein, also produced insecticidal factors that were active against a variety of insect pests. See also U.S. Pat. No. 7,244,607. More recently, an extract of *C. subtsugae* was approved by the EPA for use as an organic insecticide that is now commercially available as Grandevo® (Marrone BioInnovations, Davis, Calif.). Since the description of *C. subtsugae*, five additional species of *Chromobacterium* have been described: *C. aquaticum, C. haemolyticum, C. piscinae, C. pseudoviolaceum* and *C. vaccinii*. *Chromobacterium vaccinii* also produces insecticidal factors that kill mosquito larvae and other insect larvae. See WO 2015/020848.

*Bacillus thuringiensis* var. *kurstaki* (Btk) is an effective biocontrol agent for lepidoteran insects that has been in use since its discovery in 1962. However some species of Lepidoptera have recently become resistant to the Cry toxin produced by Btk. See, Cancino-Rodenzo, et al., Insect Biochem. Mol. Biol. 40:58-63 (2010). Thus, a need exists for another biocontrol agent that can selectively kill insects in general, and more specifically lepidopteran species.

BRIEF SUMMARY OF THE INVENTION

It is an object of this invention to have a biocontrol agent useful for killing insect larvae. This biocontrol agent contains an insecticidal composition which can be any *Chromobacterium sphagni*, media in which *C. sphagni* grew, or a combination thereof. It is a further object of this invention that the *C. sphagni* can be *C. sphagni* strain 14B-4 (NRRL B-67382), *C. sphagni* strain 37-2 (NRRL B-67131), *C. sphagni* strain 14B-5, *C. sphagni* strain 14B-6, *C. sphagni* strain 36-1, *C. sphagni* strain 36-2, *C. sphagni* strain 36-3, *C. sphagni* strain 36-4, *C. sphagni* strain 36-5, *C. sphagni* strain 36-6, *C. sphagni* strain 37-1, *C. sphagni* strain 37-3, *C. sphagni* strain 37-4, *C. sphagni* strain 37-5, *C. sphagni* strain 37-6, and a combination thereof. It is a further object of this invention that the biocontrol agent contains a carrier. This biocontrol agent can be a pellet, wettable powder, dust, granule, adherent dust or granule, solution, emulsifiable concentrate, emulsion, suspension concentrate, aerosol, and/or bait. It is also an object of this invention that the carrier can be food which insect larvae eat, water, one or more surfactants, one or more emulsifiers, one or more alcohols, one or more oils, one or more glycerols, one or more biological buffers, one or more ethers, one or more glycols, one or more ketones, one or more esters, one or more clays, one or more silicas, one or more cellulosics, one or more rubber, one or more synthetic polymers, or a combination thereof. The biocontrol agent can be further formulated with insect attractants, such as pheromones, an insect extract containing pheromones, or other non-pheromone compounds known to attract the target insects; adjuvants, adhesives, and/or dispersants.

It is an object of this invention to have a method for killing insect larvae by applying the biocontrol agent of this invention in an amount effective to kill the insect larvae to an area in which the insect larvae are present or onto an object in said area. Another object of this invention is that the biocontrol agent kills the insect larvae after the insect larvae ingest the biocontrol agent. In one embodiment of this invention, the object is a plant on which insect larvae live or which the insect larvae eat. In a further object of this invention, the insect larvae are lepidopteran insect larvae. It is also an object of this invention that the carrier in the biocontrol agent can be food which insect larvae eat, water, one or more surfactants, one or more emulsifiers, one or more alcohols, one or more oils, one or more glycerols, one or more biological buffers, one or more ethers, one or more glycols, one or more ketones, one or more esters, one or more clays, one or more silicas, one or more cellulosics, one or more rubber, one or more synthetic polymers, or a combination thereof. Another object of the invention is that the biocontrol agent can also contain one or more insect larvae attractants, one or more adjuvants, one or more pheromones, one or more adhesives, one or more dispersants, or a combination thereof.

It is an object of this invention to have a method of reducing the population of insect larvae by applying the biocontrol agent of this invention to an area in which the insect larvae are present or onto an object in the area in an amount effective to kill the insect larvae (after the larvae ingest the biocontrol agent) thereby reducing the population of said insect larvae. It is an optional object of this invention that the object is a plant on which the insect larvae live or eat. It is another object of this invention that the insect larvae are lepidopteran insect larvae. It is also an object of this invention that the carrier in the biocontrol agent can be food which insect larvae eat, water, one or more surfactants, one or more emulsifiers, one or more alcohols, one or more oils, one or more glycerols, one or more biological buffers, one or more ethers, one or more glycols, one or more ketones, one or more esters, one or more clays, one or more silicas, one or more cellulosics, one or more rubber, one or more synthetic polymers, or a combination thereof. Another object of the invention is that the biocontrol agent can also contain one or more insect larvae attractants, one or more adjuvants, one or more pheromones, one or more adhesives, one or more dispersants, or a combination thereof.

It is a further object of this invention to have a composition containing *C. sphagni* and media in which the *C. sphangi* grew. It is another object of this invention that the composition contains between approximately $10^3$ CFU to approximately $10^{10}$ CFU *C. sphagni*. It is another object of this invention that the composition can contain more than one strain of *C. sphagni*, including but not limited to, *C. sphagni* strain 14B-4 (NRRL B-67382), *C. sphagni* strain 37-2 (NRRL B-67131), *C. sphagni* strain 14B-5, *C. sphagni* strain 14B-6, *C. sphagni* strain 36-1, *C. sphagni* strain 36-2, *C. sphagni* strain 36-3, *C. sphagni* strain 36-4, *C. sphagni* strain 36-5, *C. sphagni* strain 36-6, *C. sphagni* strain 37-1, *C. sphagni* strain 37-3, *C. sphagni* strain 37-4, *C. sphagni* strain 37-5, and *C. sphagni* strain 37-6. It is further object of this invention that the *C. sphagni* has an 16S rRNA gene sequence of SEQ ID NO: 1, SEQ ID NO: 2, or SEQ ID NO: 3. It is another object of this invention that the combined 16:1 w7c/16:1 w6c fatty acids in *C. sphagni* ranges from approximately 43% to approximately 47%. It is a further object of this invention to use this composition to kill insect larvae that ingest this composition.

BRIEF DESCRIPTION OF THE SEVERAL VIEWS OF THE DRAWINGS

FIG. 1 shows the maximum likelihood analysis of 16S rRNA gene sequences from *Chromobacterium sphagni* sp. nov. 37-2 with those of recognized *Chromobacterium* species. *Vogesella indigofera* is included as an outgroup.

STATEMENT REGARDING DEPOSIT OF BIOLOGICAL MATERIAL UNDER THE TERMS OF THE BUDAPEST TREATY

The inventors deposited samples of novel *Chromobacterium sphagni* sp. nov. strain 37-2 as described herein on or before Sep. 10, 2015, and *Chromobacterium sphagni* sp. nov. strain 14B-4 as described herein on or before Feb. 15, 2017, with the U.S.D.A., Agricultural Research Service's Patent Culture Collection located at the National Center for Agricultural Utilization Research, 1815 N. University Street, Peoria, Ill. 61604, in a manner affording permanence of the deposit and ready accessibility thereto by the public if a patent is granted. The deposits have been made under the terms of the Budapest Treaty on the International Recognition of the Deposit of Microorganisms for the Purposes of Patent Procedure and the regulations thereunder. For strain 14B-4, the deposit's accession number is NRRL B-67382 and for strain 37-2 the deposit's accession number is NRRL B-67131.

All restrictions on the availability to the public of *Chromobacterium sphagni* sp. nov. strains 14B-4 (NRRL B-67382) and 37-2 (NRRL B-67131) which have been deposited as described herein will be irrevocably removed upon the granting of a patent covering these particular biological materials.

The *Chromobacterium sphagni* sp. nov. strains 14B-4 (NRRL B-67382) and 37-2 (NRRL B-67131) have been deposited under conditions such that access to the microorganisms are available during the pendency of the patent application to one determined by the Commissioner to be entitled thereto under 37 C.F.R. § 1.14 and 35 U.S.C § 122.

The deposited biological materials will be maintained with all the care necessary to keep them viable and uncontaminated for a period of at least five years after the most recent request for the furnishing of a sample of the deposited microorganisms, and in any case, for a period of at least thirty (30) years after the date of deposit for the enforceable life of the patent, whichever period is longer.

We, the inventors for the invention described in this patent application, hereby declare further that all statements regarding this Deposit of the Biological Material made on information and belief are believed to be true and that all statements made on information and belief are believed to be true, and further that these statements are made with knowledge that willful false statements and the like so made are punishable by fine or imprisonment, or both, under section 1001 of Title 18 of the United States Code and that such willful false statements may jeopardize the validity of the instant patent application or any patent issuing thereon.

DETAILED DESCRIPTION OF THE INVENTION

Described herein are two strains of a novel *Chromobacterium* species, namely, *Chromobacterium sphagni* sp. nov. strain 14B-4 (NRRL B-67382) and strain 37-2 (NRRL B-67131) and cultures in which the bacteria grew. *Chromobacterium sphagni* sp. nov. possess eight copies of the 16S rRNA gene. The full length 16S rRNA gene sequences of *C. sphagni* sp. nov. strain 37-2 (NRRL B-67131), determined by sequencing the entire genome, are in SEQ ID NO: 1 and 2 (nucleotide 1452 can be either T or C, respectively). A fragment of the 16S rRNA gene from *C. sphagni* sp. nov. strain 14B-4 (NRRL B-67382) is in SEQ ID NO: 3 and spans nucleotides 60 to 1491 of SEQ ID NOs: 1 and 2. SEQ ID NO: 3 for *C. sphagni* sp. nov. strain 14B-4 (NRRL B-67382) contains a T at 16S rRNA gene nucleotide 456 (located at position 397 in SEQ ID NO: 3) instead of a C at 16S rRNA gene at nucleotide 456 for SEQ ID NOs: 1 and 2 (located at position 456 in SEQ ID NOs: 1 and 2). Further, SEQ ID NO: 3 (strain 14B-4) contains a C at 16S rRNA gene nucleotide 1452 (located at position 1393 in SEQ ID NO: 3); whereas it is either a C or T at this location in SEQ ID NOs: 1 and 2 (strain 37-2). These bacteria produce one or more compounds that can kill insect larvae in general, and, more specifically, lepidopteran insect larvae. The *C. sphagni* sp. *nov.* strains described herein were obtained from two distinct sphagnum bogs. See Example 1, infra, for more information. Not wishing to be bound to any particular hypothesis, the *C. sphagni* sp. *nov.* strains 14B-4 (NRRL B-67382) and 37-2 (NRRL B-67131) synthesize one or more compounds which are toxic to insect larvae. Because these *C. sphagni* produce one or more compounds that are toxic to insect larvae, the bacteria and/or the media in which the bacteria grew are considered the insecticidal compositions of the biocontrol agents described herein. *C. sphagni* sp. *nov.* strain 14B-4 (NRRL B-67382) and *C. sphagni* sp. *nov.* strain 37-2 (NRRL B-67131) are representative strains of this invention. This invention includes any *C. sphagni*, isolated from a sphagnum bog and identified by its 16S rRNA gene sequence being similar to SEQ ID NOs: 1, 2 or 3, media containing any such *C. sphangi*, and the use of any such *C. sphangi* or media containing the bacteria, as described herein. In addition to strains 14B-4 and 37-2, the *C. sphagni* of this invention includes strains 14B-5, 14B-6, 36-1, 36-2, 36-3, 36-4, 36-5, 36-6, 37-1, 37-3, 37-4, 37-5, 37-6, and a combination thereof.

Described herein are methods of killing insects, involving exposing (or treating) the insect larvae to the biocontrol agents described herein by applying the biocontrol agent to an object (e.g., insects, plants, fruit trees, screens and netting, traps) or an area (e.g., water, soil, house, farm land) in need of such treatment. The amount of the biocontrol agent to be applied should be sufficient to kill the insect larvae (an effective amount). Also described herein are methods of reducing insect populations by applying an effective amount of the biocontrol agent to an object or area.

The terms "object" or "area" as used herein include any place where the presence of target pests is not desirable, including any type of tree, crop, natural or artificial parkland, watercourse, or other target pest habitat. In one embodiment, the area or object where the biocontrol agent can be dispersed, placed, applied, etc., excludes sphagnum bogs.

The terms "object" or "area" as used herein include any place where the presence of target insect pests (e.g., Lepidoptera species) are not desirable, including any type of premises, which can be out-of-doors, such as in gardens, lawns, tents, camping areas, farmland, parks, etc., or indoors, such as in barns, garages, commercial buildings, homes, etc., or any area where insect pests are a problem, such as in shipping or storage containers (e.g., bags, boxes, crates, etc.), packing materials, bedding, and so forth. Also included in the definition of object or area are the outer covering of a living being, such as skin, fur, hair, or clothing. Thus, the methods include dispensing the bacteria, media in which the bacteria were grown, or biocontrol agents described herein into the area in traps, sprays, emulsions, freeze-dried blocks, coatings or vapor form (e.g., an aerosol). One may use devices that allow a slow sustained release of bacteria, media in which the bacteria were grown, and/or biocontrol agent into the environment from a sealed canister or chemical or physical (e.g., fabric) matrix. One may also use a biocontrol agent that contains a bait for the insect pest and contains the bacteria and/or media in which the bacteria were grown. The biocontrol agent can be placed in an area or on an object where insect pests are not wanted and in a manner that the larvae of the insect pests ingest the biocontrol agent. Similarly, the biocontrol agent can contain a formulation of the media in which the bacteria were grown and sprayed onto economically important plants (crops, trees, ornamental plants, etc.) or onto other objects in a manner such that the larvae of the insect pests will ingest the biocontrol agent. In one embodiment, plants that live in sphagnum bogs are not considered economically important plants.

One applies, at a minimum, an effective amount of a biocontrol agent containing *C. sphangi* and/or media containing the bacteria, as described herein. *C. sphagni* includes, but is not limited to strains 14B-4 (NRRL B-67382), 14B-5, 14B-6, 36-1, 36-2, 36-3, 36-4, 36-5, 36-6, 37-1, 37-2 (NRRL B-67131), 37-3, 37-4, 37-5, 37-6, and a combination thereof. The term "effective amount," as used herein, means the minimum amount of the compositions needed to kill the insects when compared to the same area or object which is untreated. The precise amount needed will, by necessity, vary in accordance with the target insect; particular composition used; the type and size of area or object to be treated; weather or climatic conditions under which it is applied; and the environment in which the area or object is located. The precise amount of the composition can easily be determined by one skilled in the art given the teachings herein. In one embodiment, an effective amount contains between approximately $10^3$ to approximately $10^{10}$ CFU of at least one bacterium of this invention. In another embodiment, effective amount contains between approximately $10^5$ to approximately $10^9$ CFU of at least one bacterium of this invention. In another embodiment, effective amount contains between approximately $10^7$ to approximately $10^9$ CFU of at least one bacterium of this invention.

The biocontrol agents described herein which contain an insecticidal composition and optionally a carrier. The insecticidal composition can contain one or more *C. sphagni* strains discussed herein. The insecticidal composition may also contain media in which the bacteria were grown, alone, or with the bacteria that were cultured in that media. The media may contain the bacteria or the cytosolic components of the bacteria. In one embodiment, the bacteria are grown in media until the bacteria have reached their peak growth and the number of live bacteria is decreasing. Such media is sometimes referred to as "spent media". As such, the insecticidal composition, in one embodiment, contains spent media with the bacteria described herein. In another embodiment, the bacteria are lysed and the media is filtered to remove bacterial cell wall and membrane components. In such an embodiment, the insecticidal composition contains the spent media without whole bacteria. In yet another embodiment, the bacteria are inactivated and left in the media. In such an embodiment, the insecticidal composition contains the media and the inactivated bacteria. In another possible embodiment, the bacteria are not actively lysed, but the bacteria the media are still separated from each other. Then one can use the media or the bacteria in the biocontrol agent. In any of these embodiments, the media can be applied in a liquid-form or freeze-dried and applied as a solid, or freeze-dried and then resuspended in another liquid or reduced volume. One another embodiment, the biocontrol agent may also contain one or more other compounds (e.g., insect larvae attractants, adjuvants, pheromones, adhesives, dispersants or other insecticidal agents known in the art) provided the one or more other compounds do not substantially interfere with the insecticidal activity or efficacy of the insecticidal composition described herein. Whether or not one or more other compounds interfere with the insecticidal activity and/or efficacy of the insecticidal compositions can be determined, for example, by the procedures utilized below. The biocontrol agent, in one embodiment, excludes liquids and plants obtained from a sphagnum bog. In another embodiment, the biocontrol agent of the present invention excludes killed insects or insects that have already ingested the bacteria described herein. In another embodiment, the biocontrol agent described herein excludes water, insect bait, or other substances obtained from a sphagnum bog. "Non-sphagnum bog water" is water that is not obtained from a sphagnum bog.

The biocontrol agent described herein can contain a carrier. The carrier may be, for example, any agronomically or physiologically or pharmaceutically acceptable carrier. The carrier as used herein is defined as not including the body of an insect. One carrier is insect food. The carrier in another embodiment can be an insect attractant such as bait or pheromones. The carrier should not be harmful to plants and/or other non-target organisms. In some embodiments, the biocontrol agent can be insect food impregnated with one or more of the insecticidal composition described herein, or the insecticidal composition described herein can be sprayed onto insect food. One can apply such embodiments of the biocontrol agent to areas where the insect larvae live. In another embodiment, the carrier can be media in which said *C. sphagni* grows or grew.

The bacteria and/or media are optionally used in combination with one or more carriers or additives such as water, humectants, surfactants, inert carriers, other insecticides, and colorants; typical humectants, inert carriers, insecticides, and colorants are well known in the art. As a practical matter, it is expected that the bacteria will be formulated with an inert carrier for use as a pesticide composition. Such inert carriers are well known in the art. Water is one inert carrier, although other inert carriers suitable for use herein include but are not limited to inorganic or organic biological buffers, alcohols, ethers, glycols, ketones, esters, and solid carriers such as clays, silicas, cellulosics, rubber, or synthetic polymers. Surfactants are well-known in the art field and used to assist in the mixing of, for example, freeze-dried media containing bacteria and water.

A single application will suffice under optimum conditions, with mortality occurring rapidly, but under suboptimum conditions, either higher concentrations or multiple applications may be necessary.

The biocontrol agent described herein contains at least one *C. sphagni* and optionally one or more carriers. *C. sphagni* includes, but is not limited to, strains 14B-4 (NRRL B-67382), 14B-5, 14B-6, 36-1, 36-2, 36-3, 36-4, 36-5, 36-6, 37-1, 37-2 (NRRL B-67131), 37-3, 37-4, 37-5, 37-6, and a combination thereof.

In one embodiment, the biocontrol agent described herein also contains another insecticide effective for controlling Lepidoptera species and/or other insect species. As used herein, the term "insecticide" refers to a material or mixture of materials which induce mortality, disrupt or impede growth, interfere with metamorphosis or other morphogenic functions, effect sterilization, or interfere with feeding, metabolism, respiration, locomotion or reproduction of the targeted insects. Suitable insecticides include but are not limited to biological controls such as insect growth regulators, and materials that are toxic to insects (i.e., toxicants) such as chemical insecticides, pathogenic nematodes, fungi, protozoans, or other bacteria. In one embodiment, insecticides are slow-acting (i.e., acting over a course of hours, days, weeks, or preferably months) to reduce "avoidance" effects before individuals have distributed the insecticide to other members of the population or colony. Slow-acting insecticides are known in the art. The composition may also contain biological control agents such as toxins derived from bacteria, fungi, or other organism. One example of a biological control agent is *B. thuringiensis* toxin.

The biocontrol agents described herein may be formulated as wettable powders, dusts, granules, adherent dusts or granules, solutions, emulsifiable concentrates, emulsions, suspension concentrates, aerosols, and/or baits. The biocontrol agents may also be further formulated with insect attractants, such as pheromones, insect extracts containing pheromones, or other non-pheromone compounds known to attract the target insects.

The target insects include, but are not limited to, lepidopteran insects, such as gypsy moth (*Lymantria dispar*), diamondback moth (*Plutella xylostella*), tobacco hornworm (*Manduca sexta*), cabbage looper (*Trichoplusia ni*), corn earworm (*Helicoverpa zea*), beet armyworm (*Spodoptera exigua*), fall armyworm (*Spodoptera frugiperda*), European corn borer (*Ostrinia nubilalis*), and tobacco budworm (*Heliothis virescens*).

The terms "approximately" and "about" refer to a quantity, level, value or amount that varies by as much as 30% in one embodiment, or in another embodiment by as much as 20%, and in a third embodiment by as much as 10% to a reference quantity, level, value or amount. As used herein, the singular form "a", "an", and "the" include plural references unless the context clearly dictates otherwise. For example, the term "a bacterium" includes both a single bacterium and a plurality of bacteria of the same species.

Many techniques involving molecular biology discussed herein are well-known to one of ordinary skill in the art and are described in, e.g., Green and Sambrook, *Molecular Cloning, A Laboratory Manual* 4th ed. 2012, Cold Spring Harbor Laboratory; Ausubel et al. (eds.), *Current Protocols in Molecular Biology*, 1994—current, John Wiley & Sons; and Kriegler, *Gene Transfer and Expression: A Laboratory Manual* (1993). Unless otherwise noted, technical terms are used according to conventional usage. Definitions of common terms in molecular biology maybe found in e.g., Benjamin Lewin, *Genes IX*, Oxford University Press, 2007 (ISBN 0763740632); Krebs, et al. (eds.), *The Encyclopedia of Molecular Biology*, Blackwell Science Ltd., 1994 (ISBN 0-632-02182-9); and Robert A. Meyers (ed.), *Molecular Biology and Biotechnology: a Comprehensive Desk Reference*, VCH Publishers, Inc., 1995 (ISBN 1-56081-569-8).

Having now generally described this invention, the same will be better understood by reference to certain specific examples and the accompanying drawings, which are included herein only to further illustrate the invention and are not intended to limit the scope of the invention as defined by the claims. The examples and drawings describe at least one, but not all embodiments, of the inventions claimed. Indeed, these inventions may be embodied in many different forms and should not be construed as limited to the embodiments set forth herein; rather, these embodiments are provided so that this disclosure will satisfy applicable legal requirements.

Example 1. Isolation of Bacteria

Two new strains of *Chromobacterium sphagni* sp. nov. that fulfill the criteria for a new species, strains 14B-4 (NRRL B-67382) and 37-2 (NRRL B-67131), have been obtained. *C. sphagni* sp. nov. strain 14B-4 (NRRL B-67382) was isolated from a sphagnum bog in the Allegheny Mountains of Randolph County, W. Va. *C. sphagni* sp. nov. strain 37-2 (NRRL B-67131) was isolated from similar habitat (sphagnum bog) in Androscoggin County, Me. The following thirteen additional isolates of *Chromobacterium sphagni* sp. nov. with 16S sequences identical to those of SEQ ID NO: 1, SEQ ID NO: 2 and/or SEQ ID NO: 3, were collected from the same sites as *C. sphagni* sp. *nov.* strain 14B-4 (NRRL B-67382) and *C. sphagni* sp. *nov.* strain 37-2 (NRRL B-67131): 14B-5, 14B-6, 36-1, 36-2, 36-3, 36-4, 36-5, 36-6, 37-1, 37-3, 37-4, 37-5 and 37-6. The distribution of *C. sphagni* appears restricted to sphagnum bogs, and numbers of *C. sphagni* recovered from sphagnum bogs suggest that they are not abundant bacteria. Only through the use of a selective medium, described below, was it possible to inhibit the growth of other bacteria sufficiently to isolate *C. sphagni*, thus indicating that the concentration of *C. sphagni* strains within the sphagnum bogs are very low, compared to the concentration of other bacteria. Further, these bacteria have not been isolated in other types of wetlands. Sphagnum bogs are characterized as wetlands that accumulate peat, primarily from sphagnum moss and other acid-tolerant plants, and have high concentrations of tannins. The sphagnum bogs in the Allegheny Mountains of Randolph County, W. Va., and in Androscoggin County, Me. are typically cold, in light of their location (high altitude and high latitude, respectively).

Bacteria are isolated from water samples using a solid medium, modified from Keeble and Cross (*J. App. Microbio.* 43:2 325-327 (1977)), containing 1 g yeast extract, 3 g nutrient broth, 10 g glucose, 18 g agar, and 50 mg each of the antibiotics neomycin and cycloheximide per liter of water. Plates are incubated at 24° C. for 48 hours to 72 hours. Potential colonies of *Chromobacterium* are selected based on violet colony color. Bacteria used for insect bioassays are then grown in a liquid medium with the same components listed above but without agar or antibiotics. Liquid cultures are shaken at 200 rpm and 24° C. for 96 hours.

Example 2. Genetic and Biochemical Analyses of Bacteria

Whole genome sequencing of *C. sphagni* sp. *nov*. strain 37-2 (NRRL B-67131) on a PacBio RS II long-read sequencer (Pacific Biosciences, Menlo Park, Calif.) reveal that the strain possesses eight copies of the 16S rRNA gene, like other members of the genus *Chromobacterium*, and that nucleotide 1452 could be either T (SEQ ID NO: 1; 5 gene copies) or C (SEQ ID NO: 2; 3 gene copies). Conventional DNA sequencing of PCR amplified fragments of 16S rRNA genes from *C. sphagni* sp. *nov*. strain 14B-4 (NRRL B-67382) yield the sequence of SEQ ID NO: 3, which spans nucleotides 60 to 1491 of SEQ ID NO: 1 and SEQ ID NO: 2. SEQ ID NO: 3 shows that *C. sphagni* sp. *nov*. strain 14B-4 (NRRL B-67382) has a sequence identical to nucleotides 60 to 1491 of SEQ ID NOs: 1 and 2, obtained from *C. sphagni* sp. *nov*. strain 37-2 (NRRL B-67131), except that nucleotide 456 for 16S rRNA genes in SEQ ID NOs: 1 and 2 are C, and the corresponding nucleotide (located at the same position within 16S rRNA genes) for strain 14B-4 is T (which is located at position 397 within SEQ ID NO: 3 because SEQ ID NO: 3 starts at nucleotide 60 of SEQ ID NOs: 1 and 2). Further, SEQ ID NO: 3 contains a C at 16S rRNA gene nucleotide 1452 (located at nucleotide 1393 in SEQ ID NO: 3); whereas it is either a C or T at this location in SEQ ID NOs: 1 and 2. A comparison of 16S rRNA gene sequence of *C. sphagni* sp. *nov*. strain 37-2 (NRRL B-67131), using SEQ ID NO:1, with the 16S rRNA gene sequences of other *Chromobacterium* species (*C. violaceum, C. subtsugae, C. vaccinii, C. piscinae, C. aquaticum, C. pseudoviolaceum* and *C. haemolyticum*) indicates a lesser degree of relatedness, with *C. piscinae* displaying the fewest (19) nucleotide substitutions and *C. aquaticum* displaying the most (45) substitutions.

Maximum likelihood analysis of the sequences described above (using SEQ ID NO: 1) can be used to create a depiction of how *C. sphagni* sp. *nov*. strain 37-2 (NRRL B-67131) is related to other currently recognized *Chromobacterium* species. See FIG. 1.

In recent years, the classical DNA-DNA hybridization techniques used to differentiate bacterial species from each other have been replaced by the average nucleotide identity (ANI) method described by Richter and Rosello-Mora (*Proc. Natl. Acad. Sci. USA* 106(45):19126-31 (2009)), which is based on comparisons of genomic sequence data. When comparing two bacteria, an ANI below 95% is considered to indicate distinct species. Comparing *C. sphagni* sp. *nov*. strain 37-2 (NRRL B-67131) with available genomes of other *Chromobacterium* species results in ANI values well below 95%, indicating that *C. sphagni* sp. *nov*. strain 37-2 (NRRL B-67131) constitutes a separate species. Specifically, comparing the genome of *C. sphagni* sp. *nov*. strain 37-2 (NRRL B-67131) against the insecticidal species *C. subtsugae* and *C. vaccinii* results in ANI values of 88.5% and 87.0%, respectively. ANI cannot be calculated for *C. sphagni* sp. *nov*. strain 37-2 (NRRL B-67131) vs. *C. aquaticum*, because there is no available genome sequence for *C. aquaticum*. However, the 16S sequence for *C. aquaticum* appears more phylogenetically distant from *C. sphagni* sp. *nov*. strain 37-2 (NRRL B-67131) than several species that are clearly distinct from these isolates based on ANI values.

Table 1, below, shows ANI values for *Chromobacterium sphagni* sp. *nov*. strain 37-2 (NRRL B-67131) vs. other *Chromobacterium* species. Genomic alignments were completed using the MuMmer algorithm.

TABLE 1

| | *C. haemolyticum* T124 | *C. sphagni* NRRL B-67131 | *C. piscinae* ND17 | *C. subtsugae* PRAA4-1 | *C. vaccinii* MWU205 | *C. violaceum* ATCC12472 |
|---|---|---|---|---|---|---|
| *C. haemolyticum* T124 | | 85.20 | 85.21 | 85.41 | 85.52 | 85.52 |
| *C. sphagni* NRRL B-67131 | 85.20 | | 86.60 | 88.55 | 86.99 | 87.06 |
| *C. piscinae* ND17 | 85.23 | 86.60 | | 87.38 | 87.83 | 88.33 |
| *C. subtsugae* PRAA4-1 | 85.41 | 88.55 | 87.39 | | 88.41 | 88.20 |
| *C. vaccinii* MWU205 | 85.53 | 87.01 | 87.83 | 88.40 | | 91.00 |
| *C. violaceum* ATCC12472 | 85.51 | 87.06 | 88.32 | 88.20 | 91.00 | |

Like *C. vaccinii* MWU205$^T$ and *C. subtsugae* PRAA4-1$^T$, *C. sphagni* sp. *nov*. strain 37-2 (NRRL B-67131) produces arginine dihydrolase and protease, assimilates glucose, N-acetylglucosamine and gluconate, does not produce urease, B-glucosidase or B-galactosidase, and does not assimilate arabinose, mannitol, maltose, adipic acid or phenylacetic acid. *C. sphagni* sp. *nov.* strain 37-2 (NRRL B-67131) differs from *C. vaccinii* MWU205$^T$ in that it is not capable of assimilating malate or citrate. *C. sphagni* sp. *nov.* strain 37-2 (NRRL B-67131) differs from *C. subtsugae* PRAA4-1$^T$ in that it is capable of reducing nitrate to nitrite. Nitrate reductase genes are not detected in the genome sequence of PRAA4-1, but are found in the genome of *C. sphagni* sp. *nov.* strain 37-2 (NRRL B-67131).

Fatty acid analysis of *C. sphagni* sp. *nov.* strains 14B-4 (NRRL B-67382) and 37-2 (NRRL B-67131) using the MIDI system reveals that the combined 16:1 w7c/16:1 w6c fatty acids accounted for 46.9% and 46.2% of total fatty acid content respectively. The fraction of these particular lipids are significantly higher than the levels reported for other *Chromobacterium* species (*C. subtsugae* 41.9%; *C. vaccinii*, 41.9%; *C. violaceum*, 35.8%; *C. aquaticum*, 33.4%; *C. piscinae*, 28.7%; *C. haemolyticum* 41.7%; *C. pseudoviolaceum*, 27.5%). The mean 16:1 w7c/16:1 w6c content for all 15 isolates with 16S rRNA gene sequences identical to either SEQ ID NO: 1 and SEQ ID NO: 2 (and/or SEQ ID NO: 3) is 45.8% with a range of 43.6% to 47.1%, which does not overlap values reported for any other *Chromobacterium* species.

Example 3. Insecticidal Activity

*C. subtsugae* PRAA4-1$^T$ displays broad insecticidal activity when assayed against the lepidopteran diamondback moth or gypsy moth, and the dipteran seedcorn maggot. Meanwhile, *C. vaccinii* MWU205$^T$ appears active only against the seedcorn maggot (which differs from the activity of *C. vaccinii* MWU205$^T$ presented in WO 2015/020848 (Martin and Soby)). In contrast, *C. sphagni* sp. *nov*. strains 14B-4 and 37-2 display insecticidal activity comparable to *C. subtsugae* PRAA4-1$^T$ against diamondback moth (see Tables 2 and 3, infra) and gypsy moth (see Table 4 for strain 14B-4 only, infra), but not against seedcorn maggot (data not presented). *C. sphagni* sp. *nov.* 37-2 also substantially inhibits its growth of the lepidopteran pests tobacco hornworn and cabbage looper (see Tables 5 and 6, infra).

For diamondback moth, gypsy moth and seedcorn maggot, freeze dried pellets of insect diet are rehydrated with whole liquid cultures of *Chromobacterium* species (*C. sphagni* sp. *nov*. strain 14B-4 (NRRL B-67382), *C. sphagni* sp. *nov*. strain 37-2 (NRRL B-67131), *C. subtsugae* PRAA4-1$^T$, or water (negative control)) and are fed to the insect larvae. For gypsy moth and diamondback moth assays, the diet is as described by Bell, et al. (Development of mass rearing technology. In *The gypsy moth: Research toward integrated pest management*. Doane and McManus (eds.), U.S. Department of Agriculture Technical Bulletin 1584, Washington, pp 599-633.1981). For seedcorn maggot assays an artificial medium containing 50 g ground lima beans (Bio-Serv), 1.35 g meat and bone meal, and 10 g agar in 500 ml water is used. Hot diet is poured into 96-well ELISA plates with a volume of 300 μl per well, allowed to cool, and frozen. Diet is then freeze dried, and the resulting pellets removed from the ELISA plates. Liquid cultures are grown at 24° C. for 96 hours while shaking at 200 rpm. Assays comparing toxicities of different *Chromobacterium* strains and species are conducted contemporaneously. Assays for gypsy moth and diamondback larvae are conducted with 24 insects per treatment, and replicated 5 times. The tobacco hornworm assay is run a single time with 32 larvae per treatment; the cabbage looper assays are replicated 4 times with 24 larvae per treatment. See Tables 2 and 3, below, for comparison of insecticidal activities of *C. sphagni* strains 14B-4 and 37-2 (and other *C. sphagni* isolates) with *C. subtsugae* PRAA4-1$^T$ against diamondback moth larvae, and see Table 4, below, for the insecticidal activities of *C. sphagni* strain 14B-4 and other *C. sphagni* isolates against gypsy moth larvae. The effect of consuming freeze dried diet rehydrated with whole cultures of *C. sphagni* sp. *nov.* 37-2, or *C. subtsugae* PRAA4-1 on growth of the lepidopteran pests, tobacco hornworm and cabbage looper, is also examined. Neonate tobacco hornworm and early second instar cabbage looper larvae are weighed after feeding on treatments for 6 days and compared with control larvae fed freeze dried diet rehydrated with water only, presented below in Tables 5 and 6, respectively.

TABLE 2

| Strain | Diamondback moth larvae Percent pupation ± SE |
|---|---|
| Negative Control | 68.6 ± 3.29 |
| *C. subtsugae* PRAA4-1 | 28.3 ± 6.64 |
| *C. sphagni* 14B-5 | 20.8 ± 6.04 |
| *C. sphagni* 14B-6 | 15.8 ± 4.25 |
| *C. sphagni* 14B-4 | 9.2 ± 3.33 |

TABLE 3

| Strain | Diamondback moth larvae Percent pupation ± SE |
|---|---|
| Negative Control | 72.5 ± 8.8 |
| *C. sphagni* 37-2 | 45.0 ± 9.72 |
| *C. sphagni* 37-5 | 43.3 ± 12.19 |
| *C. subtsugae* PRAA4-1 | 9.2 ± 5.17 |

TABLE 4

| Strain | Gypsy moth larvae Percent mortality ± SE |
|---|---|
| *C. sphagni* 14B-5 | 30.5 ± 10.43 |
| *C. subtsugae* PRAA4-1 | 29.2 ± 9.03 |
| *C. sphagni* 14B-6 | 28.3 ± 7.84 |
| *C. sphagni* 14B-4 | 29.2 ± 10.46 |
| Negative Control | 1.7 ± 1.7 |

TABLE 5

| Strain | Tobacco hornworm larvae Weight ± SE |
|---|---|
| Negative Control | 156.9 ± 4.8 |
| *C. subtsugae* PRAA4-1 | 30.3 ± 2.96 |
| *C. sphagni* 37-2 | 23.0 ± 2.15 |

TABLE 6

| Strain | Cabbage looper larvae Weight ± SE |
|---|---|
| Negative Control | 95.3 ± 3.08 |
| *C. subtsugae* PRAA4-1 | 62.5 ± 2.20 |
| *C. sphagni* 37-2 | 46.4 ± 1.87 |

In another embodiment of this invention, a formulation of a biocontrol agent composition containing *C. sphagni* is a wettable powder produced by combining a spray dried liquid fermentation media of the bacterium (containing the bacterium) with water containing emulsifiers and surfactants that promote dispersal and suspension of the spray dried powder in the water, and also promote wetting of leaf surfaces. One applies this biocontrol agent to leaf surfaces. When an insect feeds on a treated leaf, the insect ingests the *C. sphagni* strain(s) and dies.

The foregoing detailed description and certain representative embodiments and details of the invention have been presented for purposes of illustration and description of the invention. It is not intended to be exhaustive or to limit the invention to the precise forms disclosed. It will be apparent to practitioners skilled in the art that modifications and variations may be made therein without departing from the scope of the invention. All references cited herein are incorporated by reference.

We, the inventors, claim as follows:

1. A method of killing insect larvae comprising applying a biocontrol agent in an amount effective to kill said insect larvae, wherein said insecticidal composition comprises isolated *Chromobacterium sphagni*, or media in which said *C. sphagni* grew, or a combination thereof, and wherein said biocontrol agent is applied to an area in which said insect larvae are present or onto an object in said area.

2. The method of claim 1, wherein said *C. sphagni* is selected from the group consisting of *C. sphagni* strain 14B-4 deposited under the accession number NRRL B-67382 and *C. sphagni* strain 37-2 deposited under the accession number NRRL B-67131 and a combination thereof.

3. The method of claim 1, wherein said object is a plant on which said insect larvae live or eat.

4. The method of claim 1, wherein said insect larvae are lepidopteran insect larvae.

5. The method of claim 1, wherein said carrier is selected from the group consisting of food of said insect larvae, water, one or more surfactants, one or more emulsifiers, one or more alcohols, one or more oils, one or more glycerols, one or more biological buffers, one or more ethers, one or more glycols, one or more ketones, one or more esters, one or more clays, one or more silicas, one or more cellulosics, one or more rubber, one or more synthetic polymers, and a combination thereof.

6. The method of claim 1, wherein said biocontrol agent further comprises at least one of insect larvae attractants, adjuvants, pheromones, adhesives, and dispersants.

7. A method of reducing the population of insect larvae comprising applying a biocontrol agent in an amount effective to kill said insect larvae upon their ingestion of said biocontrol agent thereby reducing the population of said insect larvae, wherein said biocontrol agent comprises a carrier and an insecticidal composition comprising *Chromobacterium sphagni*, or media in which said *C. sphagni* grew, or a combination thereof, and wherein said biocontrol agent is applied to an area in which said insect larvae are present or onto an object in said area, wherein the reduction in the population of the insect larvae is when compared to the same area or the same object which is untreated with the biocontrol agent.

8. The method of claim 7, wherein said *C. sphagni* is selected from the group consisting of *C. sphagni* strain 14B-4 deposited under the accession number NRRL B-67382 and *C. sphagni* strain 37-2 deposited under the accession number NRRL B-67131 and a combination thereof.

9. The method of claim 7, wherein said object is a plant on which said insect larvae live or eat.

10. The method of claim 7, wherein said insect larvae are lepidopteran insect larvae.

11. The method of claim 7, wherein said carrier is selected from the group consisting of food of said insect larvae, water, one or more surfactants, one or more emulsifiers, one or more alcohols, one or more oils, one or more glycerols, one or more biological buffers, one or more ethers, one or more glycols, one or more ketones, one or more esters, one or more clays, one or more silicas, one or more cellulosics, one or more rubber, one or more synthetic polymers, and a combination thereof.

12. The method of claim 7, wherein said biocontrol agent further comprises at least one of insect larvae attractants, adjuvants, pheromones, adhesives, and dispersants.

* * * * *

SEQUENCE LISTING

<160> NUMBER OF SEQ ID NOS: 3

<210> SEQ ID NO 1
<211> LENGTH: 1546
<212> TYPE: DNA
<213> ORGANISM: Chromobacterium sphagni strain 37-2

<400> SEQUENCE: 1

```
tgagattgaa ctgaagagtt tgatcctggc tcagattgaa cgctggcggc atgctttaca      60
catgcaagtc gaacggtaac agggagcttg ctccgctgac gagtggcgaa cgggtgagta     120
acgcatcgga atgtaccgtg taatggggga tagctcggcg aaagccggat taataccgca     180
tacgccctga gggggaaagt gggggaccgt aaggcctcac gttatacgag cagccgatgt     240
ctgattagct agttggtgag gtaagagctc accaaggcga cgatcagtag cgggtctgag     300
aggatgatcc gccacactgg gactgagaca cggcccagac tcctacggga ggcagcagtg     360
gggaattttg gacaatgggc gcaagcctga tccagccatg ccgcgtgtct gaagaaggcc     420
ttcgggttgt aaaggacttt tgttcgggag gaaatcccgc tggttaatac ctggcgggga     480
tgacagtacc ggaagaataa gcaccggcta actacgtgcc agcagccgcg gtaatacgta     540
gggtgcaagc gttaatcgga attactgggc gtaaagcgtg cgcaggcggt tttgcaagtc     600
tgatgtgaaa gccccgggct caacctggga acggcattgg agactgcaag actagagtgc     660
gtcagagggg ggtagaattc cgcgtgtagc agtgaaatgc gtagagatgc ggaggaatac     720
cgatggcgaa ggcagccccc tgggatgaca ctgacgctca tgcacgaaag cgtggggagc     780
aaacaggatt agataccctg gtagtccacg ccctaaacga tgtcaattag ctgttggggg     840
tttgaatcct tggtagcgta gctaacgcgt gaaattgacc gcctggggag tacggccgca     900
aggttaaaac tcaaaggaat tgacgggac ccgcacaagc ggtggatgat gtggattaat     960
tcgatgcaac gcgaaaaacc ttacctgctc ttgacatgta cggaacttgc cagagatggc    1020
ttggtgcccg aaagggagcc gtaacacagg tgctgcatgg ctgtcgtcag ctcgtgtcgt    1080
gagatgttgg gttaagtccc gcaacgagcg caacccttgt cattagttgc catcattaag    1140
ttgggcactc taatgagact gccggtgaca aaccggagga aggtggggat gacgtcaagt    1200
cctcatggcc cttatgagca gggcttcaca cgtcatacaa tggtcggtac agagggtcgc    1260
taagccgcga ggtggtgcca atctcataaa accgatcgta gtccggatcg cactctgcaa    1320
ctcgagtgcg tgaagtcgga atcgctagta atcgcagatc agcatgctgc ggtgaatacg    1380
ttcccgggtc ttgtacacac cgcccgtcac accatgggag tgagtttcac cagaagtggg    1440
taggctaacc gtaaggaggc cgcttaccac ggtgggattc atgactgggg tgaagtcgta    1500
acaaggtagc cgtagggaa cctgcggctg gatcacctcc tttcta                   1546
```

<210> SEQ ID NO 2
<211> LENGTH: 1546
<212> TYPE: DNA

<213> ORGANISM: Chromobacterium sphagni strain 37-2

<400> SEQUENCE: 2

```
tgagattgaa ctgaagagtt tgatcctggc tcagattgaa cgctggcggc atgctttaca        60
catgcaagtc gaacggtaac agggagcttg ctccgctgac gagtggcgaa cgggtgagta       120
acgcatcgga atgtaccgtg taatggggga tagctcggcg aaagccggat taataccgca       180
tacgccctga gggggaaagt gggggaccgt aaggcctcac gttatacgag cagccgatgt       240
ctgattagct agttggtgag gtaagagctc accaaggcga cgatcagtag cgggtctgag       300
aggatgatcc gccacactgg gactgagaca cggcccagac tcctacggga ggcagcagtg       360
ggaattttg acaatgggc gcaagcctga tccagccatg ccgcgtgtct gaagaaggcc        420
ttcggttgt aaaggactt tgttcgggag gaaatcccgc tggttaatac ctggcgggga        480
tgacagtacc ggaagaataa gcaccggcta actacgtgcc agcagccgcg gtaatacgta       540
gggtgcaagc gttaatcgga attactgggc gtaaagcgtg cgcaggcggt tttgcaagtc       600
tgatgtgaaa gccccgggct caacctggga acggcattgg agactgcaag actagagtgc       660
gtcagagggg ggtagaattc cgcgtgtagc agtgaaatgc gtagagatgc ggaggaatac       720
cgatggcgaa ggcagccccc tgggatgaca ctgacgctca tgcacgaaag cgtggggagc       780
aaacaggatt agataccctg gtagtccacg ccctaaacga tgtcaattag ctgttgggg        840
tttgaatcct tggtagcgta gctaacgcgt gaaattgacc gcctgggag tacggccgca        900
aggttaaaac tcaaaggaat tgacgggac ccgcacaagc ggtggatgat gtggattaat       960
tcgatgcaac gcgaaaaacc ttacctgctc ttgacatgta cggaacttgc cagagatggc      1020
ttggtgcccg aaagggagcc gtaacacagg tgctgcatgg ctgtcgtcag ctcgtgtcgt      1080
gagatgttgg gttaagtccc gcaacgagcg caacccttgt cattagttgc catcattaag      1140
ttgggcactc taatgagact gccggtgaca aaccggagga aggtggggat gacgtcaagt      1200
cctcatggcc cttatgagca gggcttcaca cgtcatacaa tggtcggtac agagggtcgc      1260
taagccgcga ggtggtgcca atctcataaa accgatcgta gtccggatcg cactctgcaa      1320
ctcgagtgcg tgaagtcgga atcgctagta atcgcagatc agcatgctgc ggtgaatacg      1380
ttcccgggtc ttgtacacac cgcccgtcac accatgggag tgagtttcac cagaagtggg      1440
taggctaacc gcaaggaggc cgcttaccac ggtgggattc atgactgggg tgaagtcgta      1500
acaaggtagc cgtaggggaa cctgcggctg atcacctcc tttcta                     1546
```

<210> SEQ ID NO 3
<211> LENGTH: 1432
<212> TYPE: DNA
<213> ORGANISM: Chromobacterium sphagni strain 14B-4

<400> SEQUENCE: 3

```
acatgcaagt cgaacggtaa cagggagctt gctccgctga cgagtggcga acgggtgagt        60
aacgcatcgg aatgtaccgt gtaatggggg atagctcggc gaaagccgga ttaataccgc       120
atacgccctg agggggaaag tggggaccg taaggcctca cgttatacga gcagccgatg        180
tctgattagc tagttggtga ggtaagagct caccaaggcg acgatcagta gcgggtctga       240
gaggatgatc cgccacactg gactgagac acggcccaga ctcctacggg aggcagcagt       300
ggggaattt ggacaatggg cgcaagcctg atccagccat gccgcgtgtc tgaagaaggc        360
cttcggttg taaggactt tgttcggga ggaaattccg ctggttaata cctggcgggg         420
atgacagtac cggaagaata agcaccggct aactacgtgc cagcagccgc ggtaatacgt       480
```

```
agggtgcaag cgttaatcgg aattactggg cgtaaagcgt gcgcaggcgg ttttgcaagt        540
ctgatgtgaa agccccgggc tcaacctggg aacggcattg gagactgcaa gactagagtg        600
cgtcagaggg gggtagaatt ccgcgtgtag cagtgaaatg cgtagagatg cggaggaata        660
ccgatggcga aggcagcccc ctgggatgac actgacgctc atgcacgaaa gcgtggggag        720
caaacaggat tagataccct ggtagtccac gccctaaacg atgtcaatta gctgttgggg        780
gtttgaatcc ttggtagcgt agctaacgcg tgaaattgac cgcctgggga gtacggccgc        840
aaggttaaaa ctcaaaggaa ttgacgggga cccgcacaag cggtggatga tgtggattaa        900
ttcgatgcaa cgcgaaaaac cttacctgct cttgacatgt acggaacttg ccagagatgg        960
cttggtgccc gaaagggagc cgtaacacag gtgctgcatg gctgtcgtca gctcgtgtcg       1020
tgagatgttg ggttaagtcc cgcaacgagc gcaaccettg tcattagttg ccatcattaa       1080
gttgggcact ctaatgagac tgccggtgac aaaccggagg aaggtgggga tgacgtcaag       1140
tcctcatggc ccttatgagc agggcttcac acgtcataca atggtcggta cagagggtcg       1200
ctaagccgcg aggtggtgcc aatctcataa aaccgatcgt agtccggatc gcactctgca       1260
actcgagtgc gtgaagtcgg aatcgctagt aatcgcagat cagcatgctg cggtgaatac       1320
gttcccgggt cttgtacaca ccgcccgtca caccatggga gtgagtttca ccagaagtgg       1380
gtaggctaac cgcaaggagg ccgcttacca cggtgggatt catgactggg gt               1432
```